April 27, 1937.   W. ASHTON   2,078,827
MEANS FOR TAGGING ANIMALS AND PARTICULARLY POULTRY
Filed Oct. 4, 1935
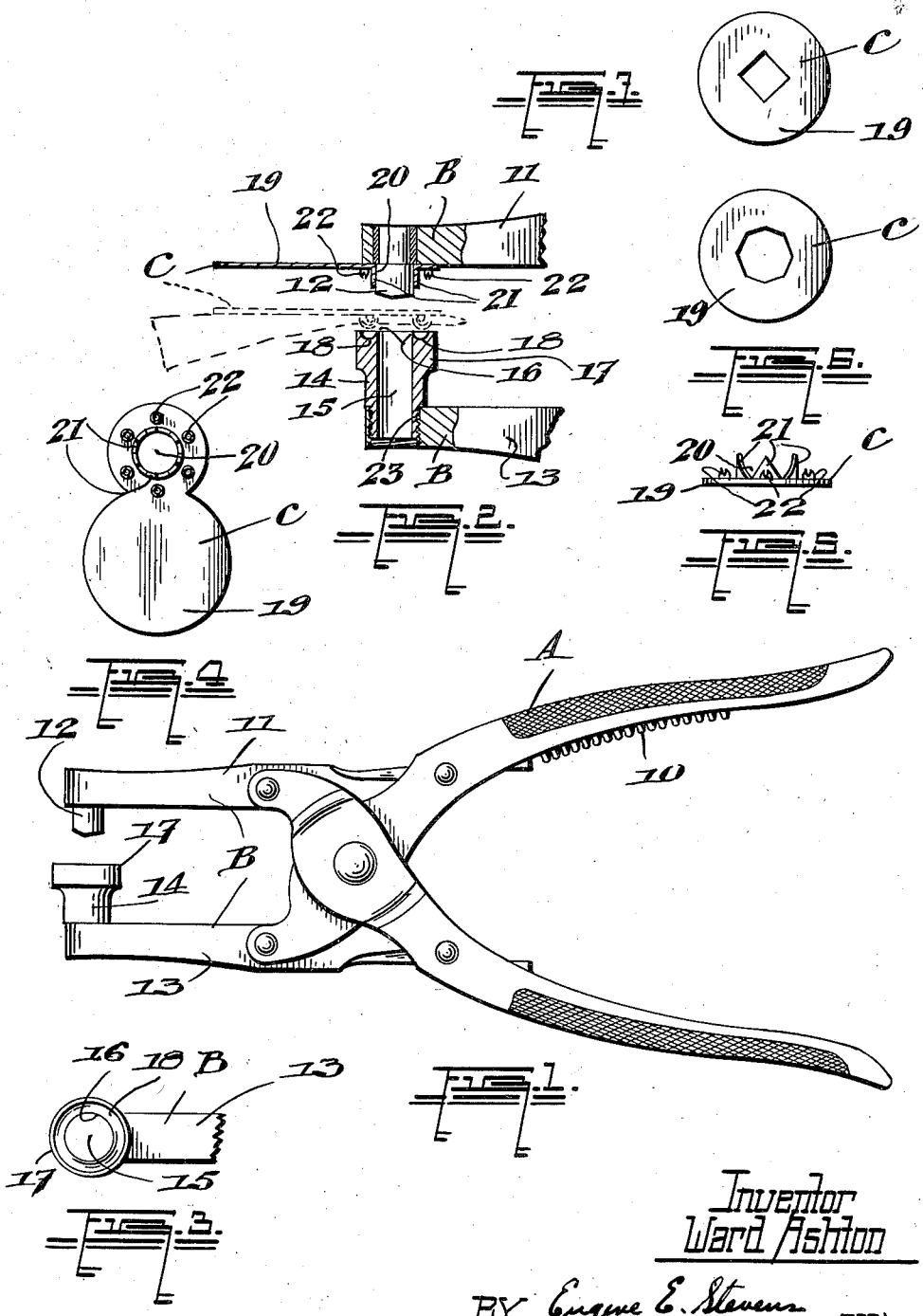
Inventor
Ward Ashton
BY Eugene E. Stevens
Atty.

Patented Apr. 27, 1937

2,078,827

UNITED STATES PATENT OFFICE 2,078,827

MEANS FOR TAGGING ANIMALS AND PARTICULARLY POULTRY

Ward Ashton, Ottawa, Ontario, Canada, assignor to Henry G. Ketchum, Luzerne, N. Y.

Application October 4, 1935, Serial No. 43,630
In Canada April 17, 1935

2 Claims. (Cl. 128—331)

This invention relates to means for tagging animals and particularly poultry.

An object of the invention is to provide a simple form of tool through which tags may be applied, for instance to the wings of poultry, in one simple operation wherein the tag mounted on the tool is clinched firmly on the wing and the wing is preliminarily punched to receive the tag in the same operation.

A further object of the invention is to provide a simplified tool, the working part of which may readily be replaced if necessary.

A further object of the invention is to provide a simple and extremely efficient form of tag structure which will firmly remain on the part upon which it is clinched.

With these and other objects in view, the invention consists preferably in a pair of pliers, the jaws of which move towards and away from each other in parallel relation, the end of one jaw being provided with a punching die and the end of the other jaw carrying a co-operating cutting and forming member which may take the form of a projecting centrally bored pedestal formed with an upstanding annular cutting edge and an annular trough or groove for deflecting portions of the tag to clinch them during the tagging operation.

Associated with the tool is a special form of tag having an orifice to correspond with the size of the punch, that part of the tag surrounding the orifice having projecting prongs which are acted upon by the trough or groove of the pedestal to turn them back and clinch them, the tag having projections in it in an area surrounding the orifice to cooperate with the pointed projecting prongs when they are clinched, thus to hold the tag firmly on the part on which it is mounted and clinched, as more fully described in the following specification and illustrated in the accompanying drawing, in which, Figure 1 is a plan view of the improved pliers.

Figure 2 is an enlarged sectional view of the jaws with the punch and pedestal mounted thereon.

Figure 3 is a fragmentary plan view of the lower jaw of the tool.

Figure 4 is a plan view of one form of tag.

Figure 5 is a plan view of an alternative form of tag.

Figure 6 is a plan view of the reverse side of a tag showing an opening of polygonal shape, and Figure 7 is a plan view of the reverse side of a tag showing an opening square in shape.

Referring to the drawing, A indicates a suitable pair of pliers having the jaws B which are mounted in parallel relation and move towards and away from each other without changing this parallel position. Pliers of this type are well known and usually employ spring means such as 10 to return the pliers to their normal open position. The jaws B are spaced apart to a desired extent, jaw 11 carrying a suitable projecting die or punch 12 which is of a length sufficient to penetrate the wings of poultry or the like and also to accommodate the thickness of the tag. Jaw 13 has mounted thereon a projecting pedestal or cutting and forming member 14 which is centrally bored as at 15 to receive the punch or die 12 and to discharge punched material, said member being formed with an upstanding annular cutting edge 16 at the top. The upper portion of the pedestal or cutting and forming member has an enlarged head 17 and between the cutting edge 16 and the outer edge of the member a trough or rounded annular groove 18 is formed, the defining walls of which slope upwardly on one side to the outer edge of the head and on the other slope upwardly towards the central bore to form the upstanding cutting edge. Thus, when the pliers are operated, the wing or other member to which a tag is to be applied is cleanly punched, through the co-operation of the cutting edge 16 and the punch or die 12, whereas at the same time a tag such as C carried by the punch or die 12 is projected through the opening formed in the wing or other member punched and projections on the tag are clinched through contact with the curved surface of the groove 18.

The tag may take any desirable form such as that illustrated in Figure 4 or that illustrated in Figure 6, the only difference being that the tag shown in Figure 4 carries a labelling tag 19 whereas the disclosure in Figure 6 is of disc-like form, the annular solid part of which receives the labelling data. In each case, however, the securing portion is formed with a central orifice 20 having a plurality of upstanding pointed projecting prongs 21 which, as shown in Figure 2, when mounted on the punch or die 12 are designed to project downwardly towards the part to which the tag is to be applied.

On further reference to Figure 2, it will be seen, as illustrated in dotted lines, that when the jaws of the pliers are brought together the projecting prongs 21 of the tag will be clinched into the wing or the like and, by perforating the tag as at 22 directly behind the projecting prongs 21 in such a manner that small upstanding projections are made on the face of the tag, as shown in Figure 2, the points 21 will, when they are turned backwardly, either enter into the orifices 22 or lie adjacent thereto so that between the upstanding projections around the orifices 22 and the projecting prongs 21 the tag is very firmly clinched on its mounting. Of course, the orifices 22 need not necessarily be placed directly behind the points 21 but they could be positioned opposite the spaces between the points 21 and still would function in an efficient manner to provide for the firm holding of the tag on its mounting.

Of course, it will be obvious, particularly having regard to Figures 4, 6 and 7, that the opening in the tag may be of any suitable shape. In Figure 4 a round opening is shown, in Figure 6 an octagonal opening and in Figure 7 a square opening. Other forms have not been illustrated since this would be unnecessary.

The punch or die 12 and the pedestal or cutting and forming member 14 may be mounted on the jaws in any suitable manner, it being preferable to mount them in such a way that they may readily be removed if desired. In other words, they may be formed with screw threaded shank such as indicated at 23 in Figure 2 so that if, for any reason, these parts might have become damaged, they could be easily replaced. The punch and the opening in the pedestal or cutting and forming member may, of course, take any suitable shape to coincide with the shape of the opening formed in the tags to be applied.

It will be apparent in the foregoing that I have provided means for tagging animals wherein the member to which the tag is applied is readily punched and the tag applied to this member and firmly locked thereon all in one operation, the punching and clinching taking place almost simultaneously. It will be apparent also that the form of tag is a particularly efficient one, having regard to the fact that it is readily mounted such as in the manner described and will be very firmly clinched or secured on the mounting.

Various modifications may be made in the invention without departing from the spirit thereof or the scope of the claims and, therefore, the exact forms shown are to be taken as illustrative only and not in a limiting sense, and I desire that only such limitations shall be placed thereon as are imposed by the prior art or are specifically set forth in the appended claims.

What I claim as my invention is:—

1. Means for tagging animals, comprising a tag having an orifice therein, said orifice being bordered by a plurality of projecting prongs punched from the tag, and a plurality of projections punched in the tag spaced from said prongs, said prongs and projections co-operating to hold the tag firmly on a mounting when said prongs are clinched.

2. The device as claimed in claim 1, in which the number of the projections corresponds with the number of prongs, said projections being in alignment with said prongs.

WARD ASHTON.